United States Patent [19]

Lebrun et al.

[11] Patent Number: 5,017,640

[45] Date of Patent: May 21, 1991

[54] CONTROLLED POLYMERIZATION OF SILAZANE MONOMERS

[75] Inventors: Jean-Jacques Lebrun, Pierre Benite; Christina Bordone, Rilleu-la-Pape, both of France

[73] Assignee: Rhone-Poulenc Chimie, Courbevoie, France

[21] Appl. No.: 421,994

[22] Filed: Oct. 16, 1989

[30] Foreign Application Priority Data

Oct. 14, 1988 [FR] France .................. 88 13531

[51] Int. Cl.$^5$ ............................................. C08L 83/08
[52] U.S. Cl. ....................................... 524/588; 528/12; 528/23
[58] Field of Search ............ 524/588; 528/12, 23

[56] References Cited

U.S. PATENT DOCUMENTS 4,661,612 4/1987 George et al. .................. 556/450
4,689,382 8/1987 Lebrun et al. .................... 528/12
4,722,988 2/1988 Porte et al. ....................... 528/28
4,861,844 8/1989 Lebrun et al. .................... 528/12

FOREIGN PATENT DOCUMENTS 0235486 9/1987 European Pat. Off. .

*Primary Examiner*—Paul R. Michl
*Assistant Examiner*—Karen A. Hellender
*Attorney, Agent, or Firm*—Burns, Doane, Swecker & Mathis

[57] ABSTRACT

Organopolysilazanes or organopoly(disilyl)silazanes having controlled physicochemical properties, well adapted for shaping and pyrolysis into useful ceramic articles, are prepared by catalytically polymerizing a silazane monomer to a desired degree of polymerization, and then, either during or upon completion of polymerization, contacting the polymerization reaction medium with at least one adsorbent material.

10 Claims, No Drawings

CONTROLLED POLYMERIZATION OF SILAZANE MONOMERS

CROSS REFERENCE TO COMPANION APPLICATION

Copending application, Ser. No. 07/421,444, filed concurrently herewith an assigned to the assignee hereof.

BACKGROUND OF THE INVENTION

1. Field of the Invention

The present invention relates to the preparation of organopolysilazanes and/or organopoly(disilyl)silazanes having controlled physicochemical properties, and, more especially, to the preparation of polysilazanes particularly suited for the production of ceramic materials and shaped articles based on silicon nitride and/or silicon carbide, for example fibrous such materials/shaped articles.

2. Description of the Prior Art

Organopolysilazanes and organopoly(disilyl)silazanes, hereinafter designated "polysilazanes", are well known products existing as monomers, oligomers and cyclic or linear polymers, and also as polymer resins. These polysilazanes may be prepared by a wide variety of processes from a broad range of starting materials.

The polysilazanes may in particular be shaped and pyrolyzed into $Si_3N_4$, SiC or mixtures thereof. They may also be extruded as continuous filaments, the pyrolysis of which yields ceramic fibers.

They may also be in the form of a more or less thin film, or solid molded pieces, and used as a binder of ceramic or carbon fibers and as a sintering binder for porous ceramic shaped articles. The variety of possible forms of the polysilazanes is one of their principal advantages.

To produce good ceramic precursors, the polysilazanes must be converted, after pyrolysis, into ceramic materials in a high yield by weight. It is therefore necessary that the polysilazane have good heat resistance in pyrolysis, which may be provided in particular by a high molecular weight and/or a high viscosity of up to the solid state at ambient temperature.

The monomers or oligomers produced by the conventional ammonolysis of one or more organochlorosilanes are not good precursors, in particular because of their low boiling point temperatures. Pyrolysis thus entails their distillation, at least if it is not carried out under a high pressure, and consequently the ceramic yields are especially low. It will thus be apparent that serious need exists in this art for macromolecular polysilazane backbones having molecular weights sufficiently high to obviate the above problem.

To this end, the catalytic polymerization of silazanes to produce materials having appreciably improved ceramic yields after pyrolysis has already been proposed to this art.

Such polymerization also makes it possible to produce polysilazanes that are solid at ambient temperature and which melt at higher temperatures, thus being potentially extrudable.

However, these polymerization reactions, although they effectively increase the molecular weight of the polysilazanes, have several disadvantages, principally related to the fact that to date it has not been possible to control and deactivate them when the polysilazane, over the course of the polymerization, has attained adequate physicochemical properties for its subsequent conversion.

Therefore, by controlling the degree of polymerization of the polysilazane, it would be possible to control its melting temperature and consequently its forming temperature, which necessarily must be lower than the temperature of onset of degradation of the polymer.

On the other hand, nonnegligible residual amounts of the catalyst may still be present in the formed and recovered polysilazane, such that even following the polymerization stage proper, the polysilazane can continue to increase in molecular weight at ambient temperature and/or during a subsequent treatment and/or forming. This is manifested principally by an uncontrollable increase in the melting point of the polymer, which may be very deleterious in industrial production (handling of polymer stocks, control of materials for the conversion thereof).

SUMMARY OF THE INVENTION

Accordingly, a major object of the present invention is the provision of an improved process for the deactivation of the catalytic polymerization of the polysilazanes, thus permitting the control of the physicochemical properties of the final product polysilazanes (such as viscosity, melting point, and the like), in particular to facilitate and control their subsequent conversion.

Briefly, the present invention features an improved process for the polymerization of silazanes in the presence of a catalytically effective amount of a silazane polymerization catalyst, wherein, either during or following the polymerization, the polymerizate is contacted with at least one adsorbent material.

DETAILED DESCRIPTION OF THE PREFERRED EMBODIMENTS OF THE INVENTION

More particularly according to the present invention, it has now unexpectedly been found that the polymerization of polysilazanes can be arbitrarily controlled, both simply, economically and reproducibly to produce polymers having physicochemical properties rigorously adapted to their particular application, in particular to the production of shaped ceramic articles, such as fibers.

The organopolysilazanes polymerized by the process according to the invention are well known compounds and are easily prepared. Representatives of such silazanes include the products of reaction between (a) at least one organohalogenosilane of the formula (I):

$$R_a X_{4-a} Si \qquad (I)$$

wherein X is a halogen atom, typically chlorine, and the radicals R, which may be identical or different, are each a hydrogen atom, a linear or branched chain, optionally halogenated alkyl radical, a cycloalkyl radical, an aryl radical such as a phenyl or naphthyl radical, an arylalkyl or alkylaryl radical, an alkenyl radical such as a vinyl or allyl radical, or an alkynyl radical such as an ethynyl or propynyl radical, and a is a number equal to 0, 1, 2 or 3, and (b) an organic or organosilyl compound containing an $NH_2$ or NH group, such as, for example, ammonia, a primary or secondary amine, a silylamine, an amide, a hydrazine, a hydrazide, and the like.

As regards the compounds of formula (I), exemplary of the alkyl radicals R are the methyl, ethyl, propyl, butyl, pentyl, hexyl, heptyl and octyl radicals. Representative cycloalkyl radicals R include the cyclopentyl, cyclohexyl and cycloheptyl radicals; representative arylalkyl radicals R include the benzyl and phenylethyl radicals; and representative alkylaryl radicals R include the tolyl and xylyl radicals.

Exemplary of the organohalogenosilanes, whether used alone or in admixture, the following are particularly representative:
$CH_3HSiCl_2$, $H_2SiCl_2$, $(CH_3)_2HSiCl$, $HSiCl_3$
$(CH_3)_2SiCl_2$, $(CH_3)_3SiCl$, $CH_3SiCl_3$, $SiCl_4$
$(CH_3)_2Si(CH_2Cl)_2$, $(CH_3)_3SiCH_2Cl$, $CH_3Si(CH_2Cl)_3$
$(C_6H_5)_2SiCl_2$, $(C_6H_5)(CH_3)SiCl_2$, $C_6H_5SiCl_3$
$(CH_3)(CH_3CH_2)SiCl_2$, $(CH_3)(CH_2=CH)SiCl_2$
$(CH_3)_2(CH_2=CH)SiCl$, $(C_6H_5)_2(CH_2=CH)SiCl$
$(C_6H_5)(CH_2=CH)SiCl_2$, $CH_3(C_6H_5)(CH_2=CH)SiCl$.

Exemplary compounds containing at least one $NH_2$ or NH group and suitable for the synthesis of the above organopolysilazanes are ammonia, methylamine, dimethylamine, ethylamine, cyclopropylamine, hydrazine, methylhydrazine, ethylenediamine, tetramethylenediamine, hexamethylenediamine, aniline, methylaniline, diphenylaniline, toluidine, guanidine, aminoguanidine, urea, hexamethyldisilazane, diphenyltetratetramethyldisilazane, dimethyldiphenyldivinyldisilazane and tetramethyldisilazane.

The polysilazanes obtained upon completion of the reaction more specifically include:

(1) Linear polymers having the following formulae:
$H_2N(R_2SiNH)_pSiR_2NH_2$     (II) and
$R_3SiNH(R_2SiNH)_{p'}SiR_3$     (III)
wherein R is as defined above for formula (I); and p and p' are integers ranging from 1 to 1,000, generally ranging from 3 to 300.

The polymers of formula (II) may be prepared by contacting diorganodichlorosilanes with ammonia, and those of formula (III) by reacting ammonia with a triorganochlorosilane (see FR 1,086,932 and U.S. Pat. No. 2,564,674).

In general, the reaction of an organohalogenosilane with an organic amine is described in U.S. Pat. Nos. 3,853,567 and 3,892,583 and the reaction of an organohalogenosilane with a disilazane in BE 888,787.

(2) The cyclic polymers having the formula:

$$[\!\!-\!\!R_2SiNH\!\!-\!\!]_n \quad (IV)$$

wherein n ranges from 3 to 10, typically n=3 or 4 and R is as defined above for formula (I). These are particularly described in GB 881,178.

(3) The resinous polymers comprising recurring units selected from among those of the formulae $R_3SiNH_{0.5}$, $R_2SiNH$, $RSiNH_{1.5}$, $Si(NH)_2$.

These are advantageously prepared by contacting the corresponding organochlorosilanes, or mixture of such silanes, with ammonia, preferably in an organic solvent medium (FR 1,379,243, FR 1,392,853 and FR 1,393,728).

The organopoly(disilyl)silazanes polymerized by the process of the invention are also well known compounds and too are easily prepared. In particular, they may be prepared reacting (a) an organic or organosilyl compound containing at least one $NH_2$ or NH group, for example ammonia, a primary or secondary amine, an amide, a hydrazine, a hydrazide, and the like, with (b) at least one organohalogenodisilane of the formula:

$$R_bX_{3-b}Si-SiR_cX_{3-c} \quad (V)$$

wherein the radicals R, which may be identical or different, are as defined above, b is equal to 0, 1, 2 or 3, c is equal to 0, 1 or 2, and X ia a halogen atom, typically chlorine.

Exemplary of the compounds of formula (V) are:
$(CH_3)_2ClSiSi(CH_3)_2Cl$,      $(CH_3)_2ClSiSiCH_3Cl_2$
$CH_3Cl_2SiSiCH_3Cl_2$ Exemplary of the compounds containing at least one $NH_2$ or NH group and suitable for the synthesis of the poly(disilyl)silazanes, the compounds noted above for the aminolysis of the organohalogenomonosilanes are representative.

In general, the halogenodisilane reaction, optionally in the presence of halogenosilane, with ammonia, is described in EP 75,826. The reaction of a halogenodisilane with a disilazane is described in FR 2,497,812.

Finally, as described in EP 75,826, the organopoly(disilyl)silazanes may be prepared by reacting the aforesaid amine derivatives with mixtures of halogenated compounds of formulae (I) and (V).

The initial polysilazanes prepared from ammonia are generally designated ammonolysates and the polysilazanes prepared from an amine compound, as indicated above, are designated aminolysates. The latter thus include the ammonolysates.

Therefore, it is the aminolysates, as described above, which are treated catalytically such as to effect, depending on the nature of the initial aminolysate, polymerization and/or copolymerization and/or molecular rearrangement, in order to improve their pyrolysis behavior.

By the term "polymerization" are intended, in general, the entirety of the conversions noted above, carried out on aminolysates by a catalytic treatment.

Numerous catalysts may be used in the subject process. One important class of catalysts comprises the acid catalysts, although others are by definition not excluded; they are simply less widely used. For example, acid earths may be used, as described in Japanese Kokai No. 77/160,446. It is also possible to use the so-called Lewis acids, such as the metal salts of monocarboxylic acids and more particularly the naphthenates or octanoates of iron, zinc, manganese, lead, calcium, zirconium, tin, cobalt or cerium, with the overall conditions of their use being described, for example, in U.S. Pat. No. 3,007,886. The metal salts of inorganic acids may also be used, more particularly the sulfates, nitrates or chlorides of copper, silver, gold, zinc, cadmium, mercury, iron, cobalt or nickel, as described in U.S. Pat. No. 3,187,030.

The invention is also applicable to aminolysates polymerized by means of a strong acid, e.g., perchloric acid, $HClO_4$ and trifluoromethanesulfonic acid, according to the technique described in FR 2,577,933 assigned to the assignee hereof.

Depending on the nature of the initial aminolysates and the catalyst used, it is possible to carry out the polymerization in mass or in solution in a suitable organic solvent.

As indicated above, to date it has not been possible to easily deactivate and thus control a polysilazane polymerization reaction.

Thus, in the particular case in which trifluoromethanesulfonic acid is used as the catalyst, it is surprisingly and unexpectedly observed that the polymerization reaction continues even in the presence of the strong release of ammonia inherent in this type of polymerization, even though it is recognized that the addition of a base to the reaction medium should make it possible to terminate polymerizations of the cationic type (acid catalyst).

Therefore, in order to control these polymerization reactions according to the invention, the reaction medium is contacted with at least one adsorbent agent.

By the term "adsorbent agent" are intended any species capable of adsorbing, in the conventional sense, the catalyst enabling the polymerization reaction.

This contacting is carried out only after the degree of polymerization has advanced to such a state that a silazane polymer has been prepared having the physicochemical properties required for its intended use.

This contacting may be carried out by any known means.

In a first embodiment of the process according to the invention, the contacting may be carried out by directly introducing the adsorbent into the reaction medium in a finely divided form (powder); the polymer constituting the desired final product is then separated from the mixture by any appropriate means, in particular by filtration.

In another embodiment of the invention, the reaction medium is passed through membranes or screens based on and/or impregnated with adsorbents; this technique makes it possible to eliminate the subsequent separation stage.

The contacting parameters in this stage comprise the quantity and quality of the adsorbing agent used, the contact time and the temperature, such parameters being interrelated.

Adsorbents suitable for use according to the invention, whether alone or in any admixture include, in particular, clays, silica gels, magnesia and active carbons (see, for example, *Encyclopedia of Chemical Technology*, 3rd Edition, Vol. 1, p. 531 ff (KIRK-OTHMER).

In a preferred embodiment of the process according to the invention, active carbon is used as the adsorbent.

By the expression "active carbon", as is well known to this art, is intended any form of carbon having specific surface and porosity characteristics as to impart particularly good adsorbing properties thereto.

Respecting such adsorbents are described, in particular, in *Encyclopedia of Chemical Technology*, 3rd Edition, Vol. 4, pp. 561-570 (KIRK-OTHMER).

The active carbon is preferably employed in the form of a powder introduced directly into the reaction medium.

Small amounts of the active carbon suffice; generally, such amounts range from 0.1 to 5% by weight, preferably from 0.1 to 1% by weight relative to the total weight of the reaction medium.

The contact time may range from several minutes to one or two hours.

The temperature is generally that at which the polymerization of the initial aminolysate is carried out.

At the completion of this stage, the polymerized polysilazane is separated, possibly in solution in a solvent, by any known means, in particular by filtration.

The polysilazane recovered in this manner, optionally after eliminating the solvent by drying, constitutes the production and desired final product.

These polysilazanes find a particularly useful application in the production of ceramic materials and shaped articles comprising, at least in part, silicon nitride and/or carbide.

In the most general case (production of a powder), the polysilazane is then heated in an inert atmosphere or a vacuum at a temperature of from 600° to 1500° C., until the polysilazane is converted entirely into $Si_3N_4$ and/or SiC.

In light of their rigorously controlled physicochemical properties, the polysilazanes prepared by the process according to the invention are especially well suited for the production of ceramic shaped articles, such as fibers. The polysilazane is thus extruded in the form of fibers using an extrusion die and then heat treated (pyrolysis) to yield a fiber based on $Si_3N_4$ and/or SiC. The fibers may then be used as reinforcing structures in composite materials, in particular of the ceramic/ceramic, ceramic/plastic or metal/ceramic type.

In order to further illustrate the present invention and the advantages thereof, the following specific examples are given, it being understood that same are intended only as illustrative and in nowise limitative.

EXAMPLE 1

This example illustrates the thermal stability of the polysilazanes prepared according to the invention.

0.25 mole of hexamethylcyclotrisilazane was dissolved in 58 g isopropyl ether. Into this mixture ($\theta = 60°$ C.), trifluoromethanesulfonic acid was introduced as the catalyst, in an initial concentration of $2 \times 10^{-3}$ mole per kg of silazane.

The polymerization was then carried out for 1 hour, 45 minutes, at 60° C. The mixture was then separated into two fractions. The first fraction was that in which the mixture was treated for 30 minutes at 60° C. in the presence of 1% by weight of a powder of active carbon ("ACTICARBONE 2S" marketed by the Ceca Co.; specific BET surface: 1100 $m^2/g$). The polymerizate was then cooled and filtered on a No. 3 frit.

The second fraction was preserved as is, without the active carbon treatment.

In these two cases, the solvent was eliminated from the polymerizate over 30 minutes at 60° C. under 200 mm Hg.

Sulfur analysis showed that the product treated with the active carbon contained less than 2 ppm sulfur, while the untreated product contained 20 ppm of sulfur.

It was then determined that the treated polysilazane did not change in storage, while the untreated polysilazane rearranged with the significant formation of a product that precipitated at the ambient temperature.

EXAMPLE 2

This example illustrates the stability of the polysilazanes polymerized according to the invention under moderate heat treatments, such as drying.

A coammonolysate prepared according to the procedure of Examples 3 to 8 given below, was produced by reacting a mixture of $CH_3SiCl_3$ and $(CH_3)_2SiCl_2$ in a molar ratio of 59%/41% with ammonia, then polymerizing same for 3 hours at 74° C. in solution in 50% isopropyl ether, in the presence of trifluoromethanesulfonic acid in a concentration of $5 \times 10^{-3}$ mole per kg of the coammonolysate.

The mixture was then separated into two fractions. The first fraction was treated with active carbon (as in Example 1), while the second was preserved as is. The two fractions were then dried for 1 hour at 170° C.

under 5 mm Hg. The softening points Pr (measured on a KOFFLER bench) of the polymerizates produced were as follows:

| Product treated: Pr = 120° C. | Untreated product: Pr = 180° C. |

It will thus be seen that the untreated polymer continued to evolve during the drying stage.

EXAMPLES 3 TO 8

These examples illustrate the effect of the treatment according to the invention on the control of the softening points of the resulting polymerizates.

(A) Preparation of the initial coammonolysates:

Into a three-liter, double-walled reactor, equipped with mechanical agitation means, a gas inlet tube and a condenser, coammonolysis was carried, out in the presence of 1.1 liter isopropyl ether, of a mixture of $(CH_3)_2SiCl_2$ (form D) and $CH_3SiCl_3$ (form T) in variable proportions. The D/T mixture in isopropyl ether was cooled to 3° C. and was maintained at this temperature during the introduction of gaseous $NH_3$. The rate of introduction of $NH_3$ was maintained at about 6 ml/s of the gas and the addition was carried out over 6 hours. Over the course of the reaction, substantial amounts of ammonium chlorhydrate were formed, which thickened the solution.

Upon completion of the reaction, the $NH_4Cl$ formed was filtered on sintered glass (average pore diameter: 10 $\mu m$). The precipitate was washed several times with a dry solvent. The solution recovered was clear. The solvents were evaporated in vacuum (25 mbar at 70° C.) and the last trace amounts of solvent were eliminated at 70° C. under a 2 mbar vacuum.

The coammonolysates obtained were viscous liquids at ambient temperature.

The amounts of the chlorosilanes introduced at the onset of the reaction were the following:

EXAMPLES 3, 4, AND 5

78.7 g $(CH_3)_2SiCl_2$ (0.61 mole) and 124.1 g $CH_3SiCl_3$ 3 mole), or a molar ratio of T/D=57/43.

EXAMPLES 6, 7 AND 8

53.6 g $(CH_3)_2SiCl_2$ (0.36 mole) and 138.7 g $CH_3SiCl_3$ (1.06 mole), a T/D ratio of 75/25.

(B) Polymerization of the coammonolysates:

The coammonolysates produced under (A) were diluted to 50% by weight in isopropyl ether. The polymerization catalyst used was trifluoromethanesulfonic acid. The temperature was 70° C.

After polymerization, the products were filtered on No. 3 frit and concentrated under the same conditions: 170° C. under 2 mm Hg for 30 minutes. Depending on the examples, the following parameters were varied:

(i) with or without active carbon treatment (the conditions of the active carbon treatment are those of Example 1):

(ii) the catalyst concentration in mole per kg of the coammonolysate;

(iii) duration of the polymerization.

(C) Results obtained:

The operating parameters and the softening points Pr of the polymers obtained upon completion of the reaction are reported in the Table for Examples 3 to 8.

TABLE

| EXAMPLE | T/D | Catalyst concentration | Duration (h) | Active carbon treatment | Pr (°C.) |
|---|---|---|---|---|---|
| 3 | 57/43 | $10^{-3}$ | 1 | no | 175.0 |
| 4 | 57/43 | $10^{-3}$ | 1 | yes | 97.5 |
| 5 | 57/43 | $10^{-2}$ | 3 | yes | 122.5 |
| 6 | 75/25 | $10^{-3}$ | 1 | no | 225.0 |
| 7 | 75/25 | $10^{-3}$ | 1 | yes | 117.5 |
| 8 | 75/25 | $10^{-2}$ | 3 | yes | 205.0 |

The above results evidence that silazane polymers can be prepared having a softening point and, thus, necessarily a working temperature, such that extrusion (if fibers are to be produced) can be carried out below the critical temperature of the onset of degradation, which typically is about 200° C. for such polymers. Also, such polymers can be worked at lower temperatures, thereby saving energy and material. Moreover, flexibility and safety are improved during the stages of working of the polymer.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an organopolysilazane or organopoly(disily)silazane comprising polymerizing silazanes in the presence of a catalytically effective amount of a silazane polymerization catalyst, and then, either during or after said polymerization, contacting the polymerization reaction medium with at least one adsorbent material capable of adsorbing the catalyst.

2. The process as defined by claim 1, said catalytic polymerization being carried out in mass.

3. The process as defined by claim 1, said catalytic polymerization being carried out in solution in an organic solvent.

4. The process as defined by claim 1, said catalytic polymerization being carried out in the presence of an acid polymerization catalyst.

5. The process as defined by claim 4, said acid catalyst comprising perchloric acid or trifluoromethanesulfonic acid.

6. The process as defined by claim 1, said adsorbent material comprising a clay, silica gel, magnesia or active carbon.

7. The process as defined by claim 6, said adsorbent material comprising active carbon.

8. The process as defined by claim 7, wherein the amount of the active carbon ranges from 0.1 to 5% by weight of the total weight of the polymerization reaction medium.

9. The process as defined by claim 8, wherein said amount of the active carbon ranges from 0.1 to 1% by weight.

10. The polysilazane product of the process as defined by claim 1.

* * * * *